United States Patent [19]

Domenico

[11] 3,894,035
[45] July 8, 1975

[54] BIS-(THIOALKYLTHIO CYANATO)HALO PYRIDINES

[75] Inventor: Penelope B. Domenico, Fairfax, Va.

[73] Assignee: The Dow Chemical Company, Midland, Mich.

[22] Filed: Apr. 15, 1974

[21] Appl. No.: 461,063

[52] U.S. Cl............................ 260/294.8 G; 424/263
[51] Int. Cl.............................................. C07d 31/50
[58] Field of Search............................ 260/294.8 G

[56] References Cited
UNITED STATES PATENTS

| | | | |
|---|---|---|---|
| 3,758,482 | 9/1973 | Domenico | 260/294.8 G |
| 3,787,422 | 1/1974 | Domenico | 260/294.8 F |
| 3,787,425 | 1/1974 | Domenico | 260/294.8 G |

OTHER PUBLICATIONS

Friedrich et al., Chem. Abstracts, Vol. 63, (6), 6971F to 6972F, (Sept. 1965).

*Primary Examiner*—Alan L. Rotman
*Attorney, Agent, or Firm*—S. Preston Jones

[57] ABSTRACT

Compounds corresponding to the formula

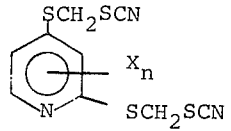

wherein X represents chloro or bromo, and n represents an integer of 2 or 3, are prepared. These compounds have been found to be useful as bactericides and fungicides.

4 Claims, No Drawings

BIS-(THIOALKYLTHIO CYANATO)HALO PYRIDINES

PRIOR ART

Various pyridyl thioalkylthio cyanates are known and are taught in Belgian Pat. No. 722,018. Other related compounds are taught in Chemical Abstract, Vol. 63, (1965) 6971f through 6972F, especially 6972b; and U.S. Pat. No. 3,758,482.

SUMMARY OF THE INVENTION

The present invention is directed to bis-(thioalkylthiocyanato)halo pyridines corresponding to the formula

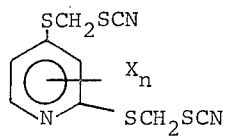

In this and succeeding formulae, X represents chloro or bromo and n represents an integer of from 2 or 3.

For convenience, the compounds embraced by the generic formula will be hereinafter identified as bis-[(thioalkyl)thiocyanato]halopyridine.

The bis-[(thioalkyl)thiocyanato]halopyridines of the present invention are crystalline solids or oils which are of low solubility in water and of moderate solubility in common organic solvents. These compounds have low phytotoxicity and are suitable for use as bactericides and fungicides.

The compounds of the present invention can be prepared by the reaction of an appropriate halo substituted 2,4-bis-[(chloromethyl)thio]pyridine (prepared as taught in U.S. Pat. No. 3,549,647) with an alkali metal thiocyanate in the presence of a solvent. This reaction can be represented as follows:

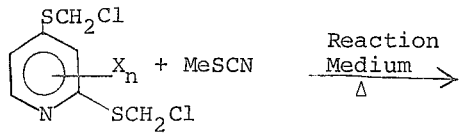

wherein X and n are as hereinbefore defined and Me represents sodium, lithium potassium cesium or rubidium.

In carrying out this reaction, the reactants are contacted together in the presence of an inert reaction medium or solvent such as, for example, dimethylformamide, hexamethylphosphoramide, or 4-formylmorpholine. The reaction is preferably carried out at room temperature, although temperatures in the range of about 0° to about 100°C can be employed. The reaction is usually carried out at atmospheric pressure. While the reaction consumes the reactants in the ratio of 2 moles of the alkali metal thiocyanate per mole of the pyridine starting material, it is preferred that an excess of up to 3 times the stoichiometric amount of the alkali metal thiocyanate be employed.

The reactants are maintained together, under agitation, until the reaction is complete. The required reaction time is usually between about 30 minutes and 4 hours. Upon completion of the reaction, the reaction mixture is diluted with cold water to precipitate out any solid product. The solid product can be purified, if desired, by recrystallization from benzene, hexane, pentane or mixtures thereof.

DESCRIPTION OF SOME PREFERRED EMBODIMENTS

The following examples illustrate the present invention and the manner by which it can be practiced, but, as such, should not be construed as limitations upon the overall scope of the same.

EXAMPLE I 3,5,6-Trichloro-2,4-bis-[(thiomethyl)thiocyanato]-pyridine

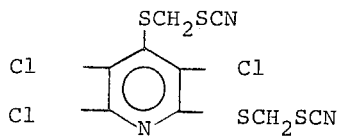

To a stirring solution of 11.87 grams (0.12 mole) of potassium thiocyanate in 25 milliliters of dimethylformamide was added 7.0 grams (0.02 mole) of 3,5,6-trichloro-2,4-bis(chloromethylthio)pyridine in 25 milliliters of dimethylformamide at 60°C. After addition was complete, the temperature was raised to 100°C and the mixture held at this temperature with stirring for one hour. Thereafter, the temperature was raised to 140°C and the mixture held for 15 minutes. The temperature was reduced to 110°C and the mixture held at this temperature for one hour. At the completion of the reaction, the reaction mixture was cooled and poured into ice water. The solid which precipitated was recovered by filtration and dried. The solid was taken up in hot benzene, dried over sodium sulfate and filtered hot. The benzene was removed down to ⅓ volume and hexane was added. The mixture was cooled and the desired 3,5,6-trichloro-2,4-bis-[(thiomethyl)thiocyanato]pyridine product which precipitated was recovered by fil-

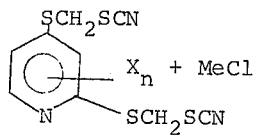

tration. The product melted at 96°C and was recovered in yield of 2.2 grams (27 percent of theoretical). Upon analysis, the product was found to have carbon, hydrogen, chlorine, nitrogen and sulfur contents of 27.2, 1.2, 28.3, 10.4 and 31.4 percent, respectively, compared with the theoretical contents of 27.8, 1.0, 27.4, 10.8 and 33.0 percent, respectively, as calculated for the above named compound.

The following compounds of the present invention are prepared in accordance with the method hereinbefore set forth.

3,5-Dichloro-2,4-bis-[(thiomethyl)thiocyanato]-pyridine, having a molecular weight of 354.29;

3,5-Dibromo-2,4-bis-[(thiomethyl)thiocyanato]-pyridine, having a molecular weight of 442.21;

3,5,6-Tribromo-2,4-bis[(thiomethyl)thiocyanato]-pyridine, having a molecular weight of 521.13;

3,5,6-Trichloro-2,4-bis-[(thiomethyl)thiocyanato]-pyridine, having a molecular weight of 388.75.

In accordance with the present invention, it has been discovered that the halopyridylthioalkylthiocyanates can be employed for the control of many bacterial and fungal organisms. In still further operations, the compounds of the present invention or compositions containing them as toxic constituents can be included in and on plaster, ink, wallboard, textiles, paper, adhesives, soaps, synthetic detergents, cutting oils, polymeric materials, embalming fluids, oil paints and latex paints to prevent the attack of various fungal pests and the subsequent economic loss due to the degradation of such products by micro-organisms. Also, the compounds can be distributed in textiles or cellulosic materials to preserve and protect such products from the attack of the organisms of rot, mold and decay.

The exact concentration of the toxicant to be employed in the treating compositions is not critical and may vary considerably provided the required dosage of the effective agent is supplied in the ink, adhesive, soap, cutting oil, polymeric material, paint, textile, paper, or growth medium. The concentration of toxicant in liquid compositions generally is from about 0.0001 to 50 percent by weight. Concentrations up to 95 percent by weight are often-times conveniently employed, particularly in concentrate compositions. In dusts, the concentrations of the toxicant can be from about 0.1 to 95 percent by weight. In compositions to be employed as concentrates, the toxicants can be present in a concentration of from 5 to 98 percent by weight. For use as a spray, it is often convenient to prepare the compounds as wettable powders.

In a representative operation, 3,5,6-trichloro-2,4-bis-[(thiomethyl)thiocyanato]pyridine when employed as the sole toxicant in a nutrient agar at a concentration of 10 parts by weight of the compound per million parts of agar was found to give 100 percent kill and control of the organisms Staphylococcus aureus, Mycobacterium phlei, Bacillus subtilis, Trichophyton mentagrophytes, Ceratocystis ips, and Aspergillus terreus.

What is Claimed is

1. A compound corresponding to the formula

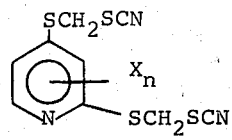

wherein X is chloro or bromo and $n$ is an integer of from 2 or 3.

2. The compound of claim 1 corresponding to the formula

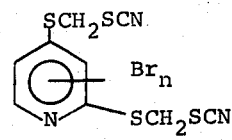

3. The compound of claim 1 corresponding to the formula

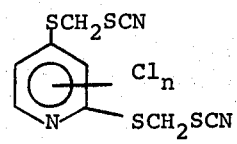

4. The compound of claim 3 which is 3,5,6-trichloro-2,6-bis-[(thiomethyl)thiocyanato]pyridine.

* * * * *